May 30, 1950     S. W. HENDERSON     2,509,343

LAWN MOWER CUTTER

Filed Sept. 25, 1948

INVENTOR.
SCOTT W. HENDERSON.
BY
Lockwood, Goldsmith & Galt
ATTORNEYS.

Patented May 30, 1950

2,509,343

UNITED STATES PATENT OFFICE 2,509,343

LAWN MOWER CUTTER

Scott W. Henderson, Kokomo, Ind.

Application September 25, 1948, Serial No. 51,166

7 Claims. (Cl. 56—294)

This invention relates to a lawn mower cutter and more particularly to a cutter so constructed as to cut grass and the like effectively without the use of a cutter bar or ledger plate in association therewith.

In the past, various cutters have been designed for effectively cutting grass, grain, and the like. In such cutters a ledger plate or cutter bar has been a significant member of the entire structure and has been positioned in shearing association with the cutter blades. The primary object of the present invention lies in the construction and operation of a cutter which does not require the use of such a ledger plate or cutter bar, and which cuts by means of a sickle type rather than a shearing type action.

A further object of the present invention is to provide a cutter having blades which are interchangeable one with another and which are removable from the shaft of the cutter for blade sharpening and the like.

A still further object of the present invention is to provide a cutter which is so constructed as to eliminate any undesirable air currents which might bring the grass into the swath of the rotating cutter at an angle which is ineffective for clean cutting action.

A still further object of the present invention is to provide a cutter having blades so constructed as to be self-cleaning. The grass which has been cut will thereby be caused to leave the blade rather than to accumulate thereon and render it less effective in its cutting action.

A still further object of the present invention lies in the construction of a cutter which may readily be reversed from a clockwise to a counter-clockwise rotating action, thereby throwing stones and sticks out in front of the mower and avoiding damage to the cutter blades ordinarily resulting when such sticks and stones are drawn under the mower through the clockwise rotation of the cutter blades.

The full nature of the invention will be understood from the accompanying drawings and the following description and claims:

Figure 1:
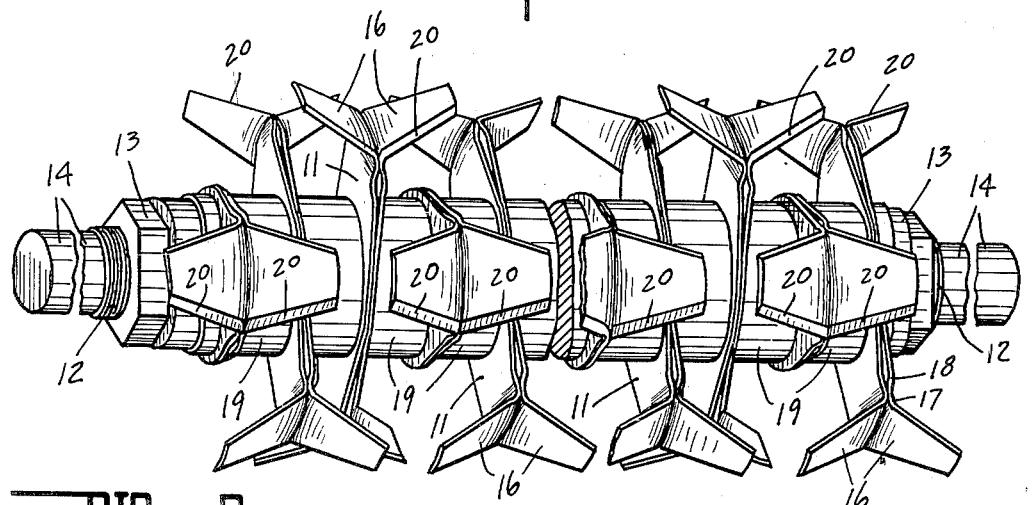
Fig. 1 is a perspective view of the cutter alone.
Figure 2:
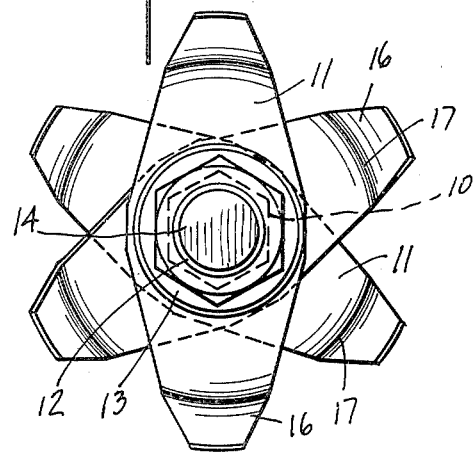
Fig. 2 is a side elevation view thereof.

In the drawings, 10 shows a polygonal spindle or shaft upon which the cutting blades 11 are mounted. This shaft contains a reduced, rounded portion 12 intermediate its ends which is threaded to accommodate the locking nut 13. The shaft 10 is still further reduced at 14 and is so constructed that it can readily be journalled in the bearings of the mower wheels (not shown).

Figure 4:
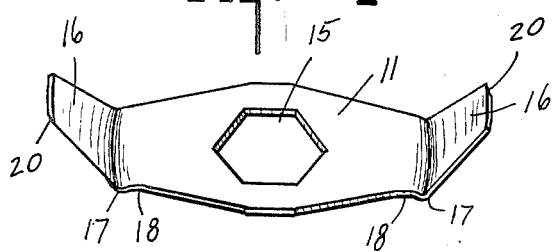
Fig. 4 is a perspective view of one of the cutter blades.

The central portion of each cutter blade 11 is stamped out to form a polygonal aperture 15 which is shown in Fig. 4 as a hexagonal one. Each blade is crimped adjacent its extremities to form the angularly disposed cutting tips 16 which form an inclined plane relative to the axis of the shaft 10. The crimping is so accomplished that a radius 17 is formed at the base of the tips 16, and a bulging portion 18 directed towards the tips is formed on the blade inwardly of each radius 17.

The blades are mounted upon the shaft 10 in a series of pairs, with the blades of each pair being disposed in back to back relationship as shown. The several pairs are held in spaced axial relation by the collars 19. These collars may be formed of metal, leather, rubber or the like. If greater resiliency or flexibility in the axial displacement of the blades is desired, as for example to compensate for the effects of engagement with rocks or the like, leather or rubber may be used instead of metal. Each pair of blades projects radially of the shaft intermediately of its adjacent pairs and equidistant peripherally thereof so as to form an interrupted helix. In short, the successive pairs are angularly offset relative to adjacent pairs. Furthermore, it is imperative that the pairs be relatively spaced axially of the shaft in such a manner that the path of rotation or swatch of their cutting tips 16 overlap that of the tips of the adjacent pairs. (See Fig. 1.)

The leading edges 20 of the cutting tips 16 are sharpened for effective cutting action. Since the blades of each pair are disposed in back to back relationship as above mentioned, it is obvious that the cutting tips of each pair are oppositely disposed relative to each other. This necessitates half of the blades being sharpened on one edge of their cutting tips and half being ground on the opposite edge thereof.

The cutting blades 11 are preferably formed of spring steel. When mounted upon the shaft 10, the several pairs thereof will be maintained in spaced axial relation, as above mentioned, by the collars 19 which can be compressed by the locking nut 13 to cause the blades of each pair to be held in close, abutting, back to back relationship. This tight relationship is achieved and maintained not only because of the action of the locking nuts upon the collars, but also because of the peculiar formation of the crimped radii 17. Any pressure upon the central portion of the blades, such as that exerted by the collars 19, causes the adjacent radii of each pair to engage each other in a close, tight relationship. This feature is of importance in that it achieves the same rigidity and the same effective cutting action that an integral V-shaped cutting tip would achieve. And yet it is much easier and more economical to stamp out cutting blades such as those disclosed herein, than ones that form a V such as the members of each pair of the blades 11 form, when positioned back to back. Furthermore, the construction of the radii 17 and the bulging portion 18 serves to restrict blade bending when stones and sticks are contacted.

Figure 3:
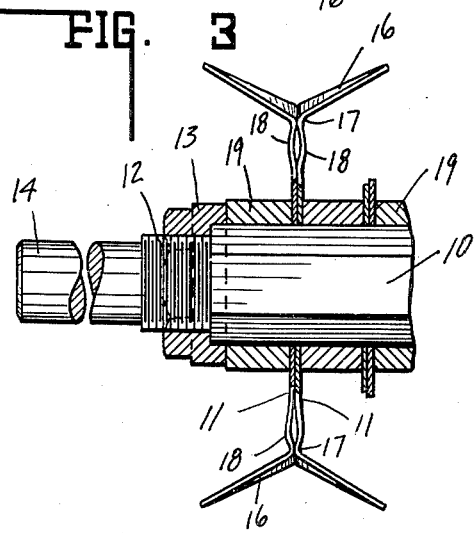
Fig. 3 is a vertical section view of a portion thereof.

By reason of the inclined plane in which the cutting tips are disposed relative to the shaft, they are self-cleaning and prevent an accumulation of grass during rotation. As shown in Fig. 3, the cutting tips are angled relative to the blade 11 at approximately 60°. Experience has proven that so long as this angle is not less than approximately 52°, the tips will automatically shed and clear themselves of the cut material. Furthermore, with the tips thus angled, they slide through the air and do not create an air current. Therefore there is little or no wind resistance or air stream to disturb the grass being cut.

In operation, the cutter is removably mounted in mower wheels at a predetermined position from the ground and will have associated with it a pulley for driving purposes. The pulley will be connected by a belt to the flywheel of a gasoline engine and the like. Since the invention is not concerned with the way in which the driving power is generated, no drawings have been made thereof. It is necessary, however, that the power source be such as to rotate the shaft 10 at a very high speed, preferably at an R. P. M. of from 3400 to 3500. This speed is more than sufficient to insure cutting prior to bending. In other words the contact is of an impact rather than push type. Therefore grass severance occurs rather than grass bending.

The invention has been found to be more effectively operated when the shaft is rotated counterclockwise, but by reversing the shaft it can also be operated effectively in a clockwise direction. While the invention has been illustrated and described in great detail in the drawings and foregoing description, the same is to be considered as illustrative and not restrictive in character.

The invention claimed is:

1. A grass and the like cutting structure of non-cutter bar type comprising a substantially horizontally disposed high speed rotatable shaft arranged for support at a predetermined distance from the ground, and a plurality of axially aligned spaced blades each having a tip inclined towards the axis of said shaft, successive blades being angularly offset relative to adjacent blades and arranged in an interrupted helical formation with the tip portions positioned to cut a swath that laps the swath of the immediately adjacent blade tips.

2. A grass and the like cutting structure of non-cutter bar type comprising a substantially horizontally disposed high speed rotatable shaft arranged for support at a predetermined distance from the ground, and in a direction towards the structure advance, and a plurality of axially aligned spaced blades each having a tip inclined towards the axis of said shaft, successive blades being angularly offset relative to adjacent blades and arranged in an interrupted helical formation with the tip portions thereof adapted to cut a swath that laps the swath of the immediately contiguous blade tips.

3. A grass and the like cutting structure of non-cutter bar type comprising a high speed rotatable shaft substantially horizontally disposed and adapted for support at a predetermined distance from the ground in a direction opposite to the structure advance, and a plurality of axially aligned blades each having a tip inclined towards the axis of said shaft, successive blades being axially and peripherally spaced relative to adjacent blades with the tip portions thereof adapted to cut a swath that laps the swath of the immediately adjacent blade tips.

4. A grass and the like cutting structure of non-cutter bar type comprising a substantially horizontally disposed shaft arranged for support at a predetermined distance from the ground and adapted to rotate at a very high speed, and a plurality of axially aligned blades each having a cutting tip inclined towards the plane of said blade at an obtuse angle, successive blades being axially and peripherally spaced relative to adjacent blades with the tip portions thereof adapted to cut a swath that laps the swath of the immediately adjacent blade tips.

5. A grass and the like cutting structure of non-cutter bar type comprising a substantially horizontally disposed shaft arranged for support at a predetermined distance from the ground, said shaft being adapted to be rotated at a very high speed, and a plurality of axially aligned blades each having a cutting tip projecting therefrom at an angle of not less than 52°, successive blades being axially spaced and angularly offset relative to the adjacent blades and arranged in an interrupted helical formation with the tip portions thereof adapted to cut a swath that laps the swath of the immediate adjacent blade tips.

6. A self-cleaning grass and the like cutting structure of non-cutter bar type comprising a shaft disposed substantially horizontally and arranged for support at a predetermined distance from the ground, said shaft being adapted to rotate at a very high speed, and a plurality of axially aligned blades each having a cutting tip projecting therefrom at an angle of approximately 60°, successive blades being axially spaced and angularly offset relative to adjacent blades to form an interrupted helical formation, the tip portions of said blades being so spaced as to cut a swath that laps the swath of the immediately adjacent blade tips.

7. A self-cleaning grass and the like cutting structure of non-cutter bar type comprising a substantially horizontally disposed shaft arranged for support at a predetermined distance from the ground, said shaft being adapted to be rotated at a very high speed, a plurality of axially aligned blades each having a cutting tip inclined towards the axis of said shaft at an obtuse angle, successive blades being axially spaced and angularly offset relative to the adjacent blades to form an interrupted helical formation with the tip portions thereof so spaced as to cut a swath that laps the swath of the immediately adjacent blade tips, and resilient spacing collars carried by said shaft between successive blades.

SCOTT W. HENDERSON.

REFERENCES CITED

The following references are of record in the file of this patent:

UNITED STATES PATENTS

| Number | Name | Date |
| --- | --- | --- |
| 1,370,352 | Parmley | Mar. 1, 1921 |